US012134916B2

(12) United States Patent
Romero

(10) Patent No.: US 12,134,916 B2
(45) Date of Patent: Nov. 5, 2024

(54) LOW PROFILE DEADBOLT

(71) Applicant: ASSA ABLOY Americas Residential Inc., New Haven, CT (US)

(72) Inventor: Oscar Romero, Lake Forest, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 0 days.

(21) Appl. No.: 18/352,473

(22) Filed: Jul. 14, 2023

(65) Prior Publication Data

US 2024/0011328 A1 Jan. 11, 2024

Related U.S. Application Data

(63) Continuation of application No. 16/554,884, filed on Aug. 29, 2019, now Pat. No. 11,739,563, which is a (Continued)

(51) Int. Cl.
*E05B 53/00* (2006.01)
*E05B 55/00* (2006.01)
(Continued)

(52) U.S. Cl.
CPC .......... *E05B 63/0017* (2013.01); *E05B 53/00* (2013.01); *E05B 55/005* (2013.01); (Continued)

(58) Field of Classification Search
CPC ......... Y10T 292/0856; Y10T 292/0916; Y10T 292/0966; Y10T 292/0993; (Continued)

(56) References Cited

U.S. PATENT DOCUMENTS

| | | | |
|---|---|---|---|
| 721,802 A | 3/1903 | Horne | |
| 1,067,048 A | 7/1913 | Miller | |

(Continued)

FOREIGN PATENT DOCUMENTS

| | | | |
|---|---|---|---|
| CA | 2903811 | 9/2014 | |
| CN | 2176291 Y * | 9/1994 | .............. E05G 1/00 |

(Continued)

OTHER PUBLICATIONS

PCT International Search Report and Written Opinion in Application PCT/US2016/045620, mailed Nov. 22, 2016, 16 pages.

(Continued)

*Primary Examiner* — Suzanne L Barrett
(74) *Attorney, Agent, or Firm* — Merchant & Gould P.C.

(57) ABSTRACT

A deadbolt assembly with a latch assembly and a lock cylinder. The deadbolt assembly includes a first torque blade longitudinally extending along a first axis and a second torque blade longitudinally extending along a second axis. The second torque blade is operatively coupled with the latch assembly to actuate the bolt between the retracted position and the extended position. The deadbolt assembly includes a geared arrangement operatively coupling the first torque blade and the second torque blade. The gear arrangement is configured to apply rotational movement of the first torque blade to the second torque blade.

19 Claims, 3 Drawing Sheets

Related U.S. Application Data continuation of application No. 15/221,808, filed on Jul. 28, 2016, now Pat. No. 10,407,942.

(60) Provisional application No. 62/204,528, filed on Aug. 13, 2015.

(51) Int. Cl.

| | |
|---|---|
| ***E05B 63/00*** | (2006.01) |
| ***E05C 1/06*** | (2006.01) |
| *E05B 15/16* | (2006.01) |
| *E05B 63/10* | (2006.01) |

(52) U.S. Cl.
CPC ............ *E05C 1/06* (2013.01); *E05B 15/1614* (2013.01); *E05B 63/10* (2013.01)

(58) Field of Classification Search
CPC ......... Y10T 292/1018; Y10T 292/1079; E05B 17/04; E05B 17/042; E05B 55/005; E05B 2017/043; E05B 17/047; E05B 2047/0014; E05B 2047/0018; E05B 2047/002; E05B 2047/0021; E05B 2047/0022; E05B 53/00; E05B 63/0017; E05B 63/10; E05C 9/023; E05C 9/041; E05C 1/06
USPC ........................................................... 70/344
See application file for complete search history.

(56) References Cited

U.S. PATENT DOCUMENTS

| | | | |
|---|---|---|---|
| 1,380,117 | A | 5/1921 | Solaini |
| RE16,123 | E | 7/1925 | Schonwald |
| 1,723,126 | A | 8/1929 | Ellison |
| 3,336,769 | A | 8/1967 | Russell et al. |
| 3,584,483 | A | 6/1971 | Orr |
| 3,740,979 | A | 6/1973 | Crepinsek |
| 4,154,070 | A | 5/1979 | Bahry et al. |
| 4,248,068 | A | 2/1981 | Esser et al. |
| 4,248,452 | A | 2/1981 | Allenbaugh |
| 4,384,465 | A | 5/1983 | Muus |
| 4,438,962 | A | 3/1984 | Soloviff et al. |
| 4,483,162 | A | 11/1984 | Dunphy |
| 4,725,085 | A | 2/1988 | Hu |
| 4,788,839 | A | 12/1988 | Shuler |
| 5,544,507 | A | 8/1996 | Lin |
| 5,595,409 | A | 1/1997 | Fier |
| 5,651,568 | A | 7/1997 | Fortune |
| 6,116,662 | A | 9/2000 | Johnson |
| 6,334,636 | B1 | 1/2002 | Huang |
| 7,025,394 | B1 | 4/2006 | Hunt |
| 7,188,495 | B2 | 3/2007 | Errani |
| 7,607,328 | B2 | 10/2009 | Ellis |
| 8,186,189 | B2 | 5/2012 | Brisco et al. |
| 10,407,942 | B2 | 9/2019 | Romero |
| 11,739,563 | B2 | 8/2023 | Romero |
| 2002/0084656 | A1 | 7/2002 | Lin |
| 2004/0212198 | A1 | 10/2004 | Glover |
| 2004/0245784 | A1 | 12/2004 | Tsai |
| 2006/0191303 | A1 | 8/2006 | Shvarts |
| 2007/0157684 | A1 | 7/2007 | Bogdanov et al. |
| 2010/0257906 | A1 | 10/2010 | Sorenson |
| 2012/0055213 | A1 | 3/2012 | Sorenson et al. |
| 2013/0174619 | A1 | 7/2013 | Wheeler et al. |
| 2014/0109633 | A1 | 4/2014 | Romero |
| 2014/0265357 | A1 | 9/2014 | Romero |

FOREIGN PATENT DOCUMENTS

| | | | | | |
|---|---|---|---|---|---|
| CN | 2230341 Y | * | 7/1996 | ............. | B60R 25/02 |
| CN | 103930636 | | 7/2014 | | |
| CN | 204457095 | | 7/2015 | | |
| JP | 2015-31070 A | | 2/2015 | | |

OTHER PUBLICATIONS

PCT International Preliminary Report on Patentability in Application PCT/US2016/045620, mailed Jul. 17, 2017, 9 pages.

* cited by examiner

LOW PROFILE DEADBOLT

RELATED APPLICATIONS

This application is a continuation of U.S. patent application Ser. No. 16/554,884, now U.S. Pat. No. 11,739,563, filed Aug. 29, 2019, which is a continuation of U.S. patent application Ser. No. 15/221,808, now U.S. Pat. No. 10,407,942, filed Jul. 28, 2016, which claims the benefit of U.S. Provisional Application No. 62/204,528, filed Aug. 13, 2015, which applications are hereby incorporated by reference in their entireties.

TECHNICAL FIELD

This disclosure is related to mechanical and electromechanical locks; in particular, this disclosure is related to a low profile deadbolt assembly.

BACKGROUND AND SUMMARY

Keyed locks have long been used to provide security for residences and other buildings. Deadbolts often supplement the security provided by keyed door handles and handle sets. The door typically has a standard-sized bore into which the latch assembly is installed. Existing latch assemblies include a spindle, which is centered in the bore, and actuated to extend and retract the bolt to lock and unlock the door. These existing latch assemblies are sized to take up much of the space in the bore, particularly during operation.

Some existing deadbolts are operated by lock cylinders that accept a key for actuating the latch assembly's spindle to extend/retract the bolt. Typically, the lock cylinder includes a torque blade that extends through and operates the spindle on the latch assembly. When a user rotates the cylinder with a valid key, this rotates the torque blade to operate the latch assembly's spindle. After installing existing latches into the standard-sized bore in the door, there is no remaining room in the bore to accommodate the lock cylinder. Instead, the lock cylinder's torque blade is axially aligned with the latch assembly's spindle, which causes the lock cylinder to project out significantly from the exterior door surface. Depending on the circumstances, this arrangement can have drawbacks. In some cases, for example, it can be aesthetically desirable for the deadbolt to have a lower profile and not extend as far from the door. It can also be desirable to have a lower profile to reduce vertical attacks to the lock.

According to one aspect, this disclosure provides a deadbolt assembly with a bolt housing, the bolt housing including therein a bolt having a proximal and distal end configured to move between fully retracted and fully extended positions. A first actuator assembly is provided having a body, a lock cylinder, a tailpiece, and a tailpiece gear. The lock cylinder may be mounted to said body with the tailpiece extending from the lock cylinder. The tailpiece may be operationally coupled to the tailpiece gear and rotatable with respect to said lock cylinder around a first axis. A second actuator assembly including a base plate, a tailpiece blade gear operationally coupled to rotate a latch blade gear may be provided. The latch blade may be rotatable around a second axis and coupled the latch blade gear at a proximal end and the bolt housing at a distal end. The tailpiece blade gear and the latch blade gear may be rotatably mounted in an interior of the mounting plate with the tailpiece extending from said lock cylinder and coupling to the tailpiece blade gear. The gears are coupled to one another so that rotation of the first actuator assembly results in corresponding rotation of the second actuator assembly.

According to another aspect, a lock actuating assembly is disclosed for operating a locking mechanism including first and second actuator assemblies. The first actuator assembly has a body, a lock cylinder, and a tailpiece. The lock cylinder is mounted to the body, and the tailpiece extends from the lock cylinder. The tailpiece is rotatable with respect to said lock cylinder around an axis. The second actuator assembly includes a base, a tailpiece gear operationally coupled to rotate a latch blade gear, and a latch blade coupled to the latch blade gear at a proximal end and a locking mechanism at the distal end. The latch blade is rotatable about a different axis than the tailpiece. Rotation of the first actuator assembly rotates the second actuator assembly, which locks and/or unlocks the locking mechanism.

In yet another aspect, a method of operating a lock is disclosed including providing a first actuator assembly including a lock cylinder and a tailpiece extending from said lock cylinder. A second actuator assembly is provided including a tailpiece gear, a latch blade gear, and a latch blade. The tailpiece is coupled to the tailpiece gear. In operation, rotating the first actuator assembly rotates the tailpiece gear, resulting in a corresponding rotation of the second actuator assembly. The second actuator assembly rotates the latch with the latch blade moving a bolt to a fully retracted or fully extended position.

Additional features and advantages of the disclosure will become apparent to those skilled in the art upon consideration of the following detailed descriptions exemplifying the best mode of carrying out the disclosure as presently perceived.

BRIEF DESCRIPTION OF THE DRAWINGS

The present disclosure will be described hereafter with reference to the attached drawings which are given as non-limiting examples only, in which.

DETAILED DESCRIPTION OF THE DRAWINGS

Figure 1:
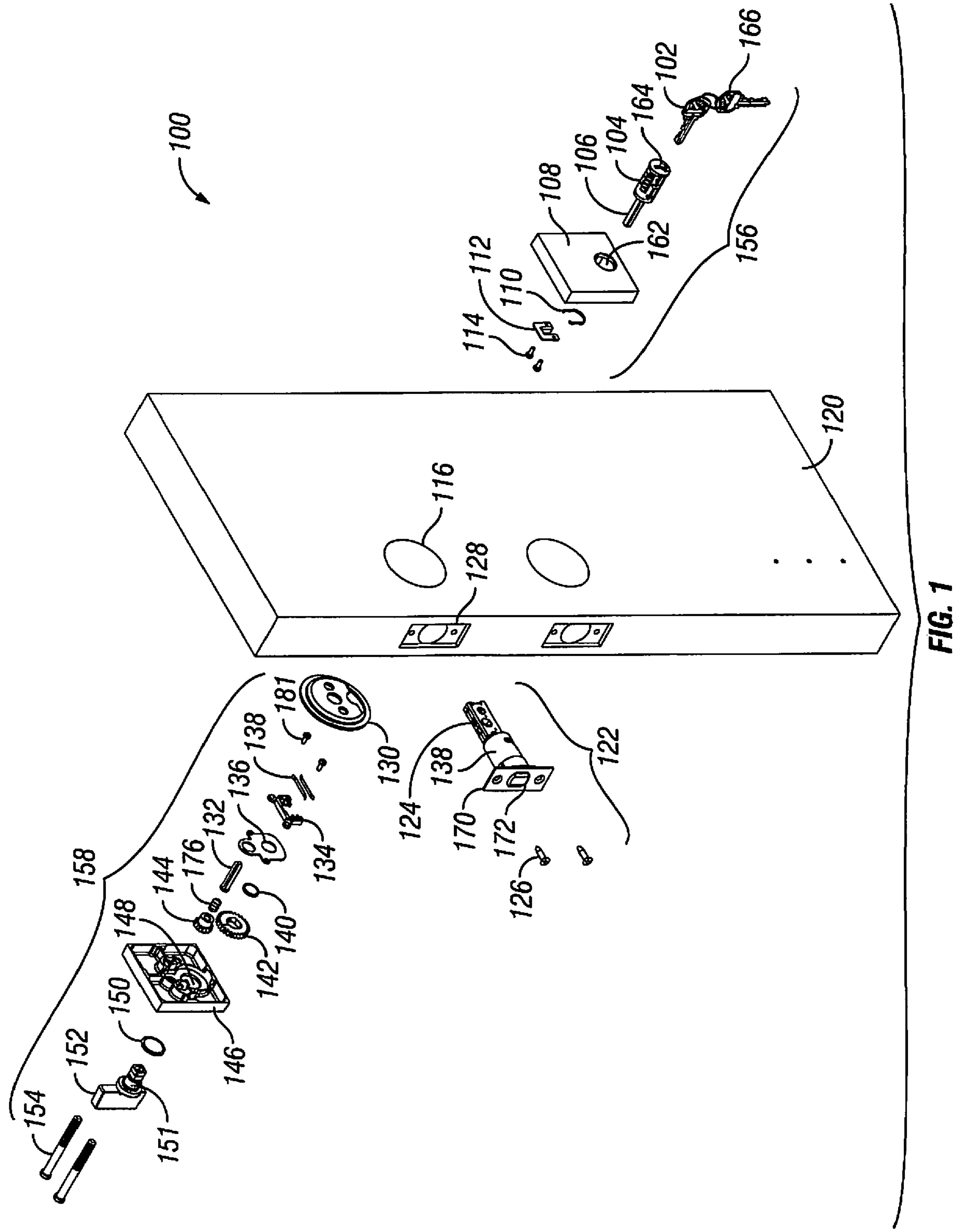
FIG. 1 is an exploded view of an example deadbolt assembly, according to an embodiment of the disclosure.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

The disclosure generally relates to a low profile locking assembly. Instead of the lock cylinder being axially aligned with the latch assembly to project outwardly from the door, the lock cylinder is offset from the latch assembly to be at least partially received within the door's bore. There is sufficient room within the bore to accommodate the lock cylinder because the latch assembly is compact in dimension and operation, which leaves sufficient space in the bore for the lock cylinder. An example of such a latch assembly is described in U.S. Patent Publication No. 2014/0265357, filed Mar. 6, 2014, for a Deadbolt Latch Assembly, which is hereby incorporated by reference in its entirety. With the lock cylinder received within the door's bore, the lock cylinder does not project outwardly as much as other locking assemblies, and may be entirely flush with the door's exterior surface in some embodiments.

The disclosure encompasses both mechanical and electromechanical locks. The term "electromechanical lock" is broadly intended to include any type of lockset that uses electrical power in some manner, such as for controlled access, but also has a mechanical portion that can be actuated with a mechanical key, including but not limited to, electronic deadbolts, electronic lever sets, etc. This disclosure encompasses the integration of one or more features described herein into any type of mechanical or electromechanical lock and is not intended to be limited to any particular type of mechanical or electromechanical lock.

FIG. 1 is an exploded view of a low profile lock assembly 100 according to one embodiment of the disclosure. In the example shown, the lock assembly 100 includes an exterior assembly 156, an interior assembly 158, and a latch assembly 122. The latch assembly 122 is mounted in a bore 116 formed in a door 120. The bore 116 is often a standard size, such as a diameter of 2.125 inches in the United States. The term "exterior" is broadly used to mean an area outside a door and "interior" is also broadly used to denote an area inside a door. With an exterior entry door, for example, the exterior assembly 156 may be mounted outside a building, while the interior assembly 158 may be mounted inside the building. With an interior door, the exterior assembly 156 may be mounted inside a building, but outside a room secured by the lock assembly 100; the interior assembly 158 may be mounted inside the secured room. The lock assembly 100 is applicable to both interior and exterior doors.

In the example shown, the exterior assembly 156 is shown for purposes of example in the form of a deadbolt. As discussed above, however, this disclosure is not intended to be limited to only a mechanical deadbolt, but encompasses any kind of mechanical or electromechanical lock. As shown, the exterior assembly 156 includes an exterior escutcheon 108 that houses internal components of the exterior assembly 156. In this embodiment, the exterior escutcheon 108 has a generally square shape, but the exterior escutcheon 108 could have a wide variety of different sizes and shapes depending on the particular circumstances. Embodiments are contemplated, for example, in which the exterior escutcheon 108 could be circular in shape and fit flush within the door bore 116. In such an embodiment, the exterior assembly 156 could entirely fit within the bore 116 without projecting from the door 120 at all.

In the embodiment shown, the exterior escutcheon 108 includes an opening 162 dimensioned to receive a lock cylinder 104. As shown, the lock cylinder 104 is coupled with the exterior escutcheon 108 through opening 162 and secured using a clip 110. An anti-drill shield 112 is disposed behind the exterior escutcheon 108. The anti-drill shield 112 is made of a drill-resistant material, such as hardened steel, and in the embodiment shown is secured with screws 114 into the exterior escutcheon 108. The anti-drill shield 112 reinforces the exterior escutcheon 108 to prevent attempts to compromise the lock by drilling through the exterior escutcheon 108 to actuate the latch assembly 122.

A first torque blade 106 extends from the lock cylinder 104. In the example shown, the lock cylinder 104 includes a mechanical lock that is actuated with a mechanical key 102 that is inserted into the lock cylinder 104 through a keyway 164 along a longitudinal axis 166 of the lock cylinder 104. Embodiments are also contemplated in which an electronic key could be used to actuate the first torque blade 106, such as using a keypad or wireless communications. As shown, an authorized key 102 can be rotated in the lock cylinder 104 to rotate the first torque blade 106, which actuates the latch assembly 122.

The latch assembly 122 is disposed in the bore 116 in the door 120 and may be actuated by a second torque blade 132 (as explained below) to extend/retract a bolt 172. The bolt 172 moves linearly in and out of a sleeve 138. When the bolt 172 is retracted, an end of the bolt 172 is generally flush with a base plate 170. When the bolt 172 is extended, the bolt 172 protrudes through an edge bore 128 in the door 120 into an opening of a strike plate (not shown), which is positioned in a jamb adjacent the door 120. As is typical, fasteners 126 attach the base plate 170 of the latch assembly 122 to the door 120.

In the embodiment shown, the latch assembly 122 includes a cam 124 that is drivable in a first direction to extend the bolt 172 and a second direction to retract the bolt 172. The cam 124 is configured to receive the second torque blade 132 such that rotation of the second torque blade 132 in a first direction retracts the bolt 172; whereas, rotation of the second torque blade 132 in the opposite direction causes the cam 124 to retract the bolt 172.

Interior assembly 158 illustratively includes an interior escutcheon 146, a turn-piece 152, a first gear 142, a second gear 144, and the second torque blade 132. The turn-piece 152 is configured to be grasped and rotated by a user to manually operate bolt 172 from inside the door 120. In the embodiment shown, the turn-piece 152 includes a drive portion 151 with an opening dimensioned to receive the first torque blade 106. The opening in the drive portion 151 is illustratively a non-circular opening, such as a square opening, so the turn-piece 152 moves concomitant with the first torque blade 106. Embodiments are also contemplated in which the turn-piece 152 could be coupled with the second torque blade 132; in such embodiments, the rotation of the turn-piece would directly cause concomitant rotation of the second torque blade 132. In some embodiments, the first torque blade 106 extends from the lock cylinder 104 underneath the latch assembly 122 and is received in the drive portion 151 of the turn-piece 152. Embodiments are also contemplated in which the lock cylinder 104 could be positioned above the latch assembly 122 depending on the circumstances. In embodiments using an electronic lock, the first torque blade 106 could be coupled with a motor that actuates the first torque blade 106 in response to entry of an authorized electronic key. For example, the exterior and interior assemblies 156, 158 could be in electronic communication so that entry of a pin number on a keypad in the exterior assembly 156 could actuate a motor (not shown) that is part of the interior assembly 158 to actuate the first torque blade 106. As illustratively shown, a spacer ring 150 surrounds drive portion 151 of turn-piece 152 to allow rotation with respect to the interior escutcheon 146. The first gear 142 is interposed on and movable with the first torque blade 106 while the second gear 144 is interposed on and movable with the second torque blade 132. The escutcheon 146 defines a first recessed area 148 configured to rotatably receive the first gear 142 and a second recessed area 147 configured to rotatably receive the second gear 144.

An interior mounting plate 130 includes a projecting portion configured to be received in the door bore 116 and fasteners 154 extend through the interior escutcheon 146, interior mounting plate 130 and fasten into the exterior escutcheon 108 to couple the exterior assembly 156 to the interior assembly 158. In the embodiment shown, a distal end 206 (FIG. 2) of the second torque blade 132 is configured to extend through and actuate the latch assembly 122.

Figure 2:
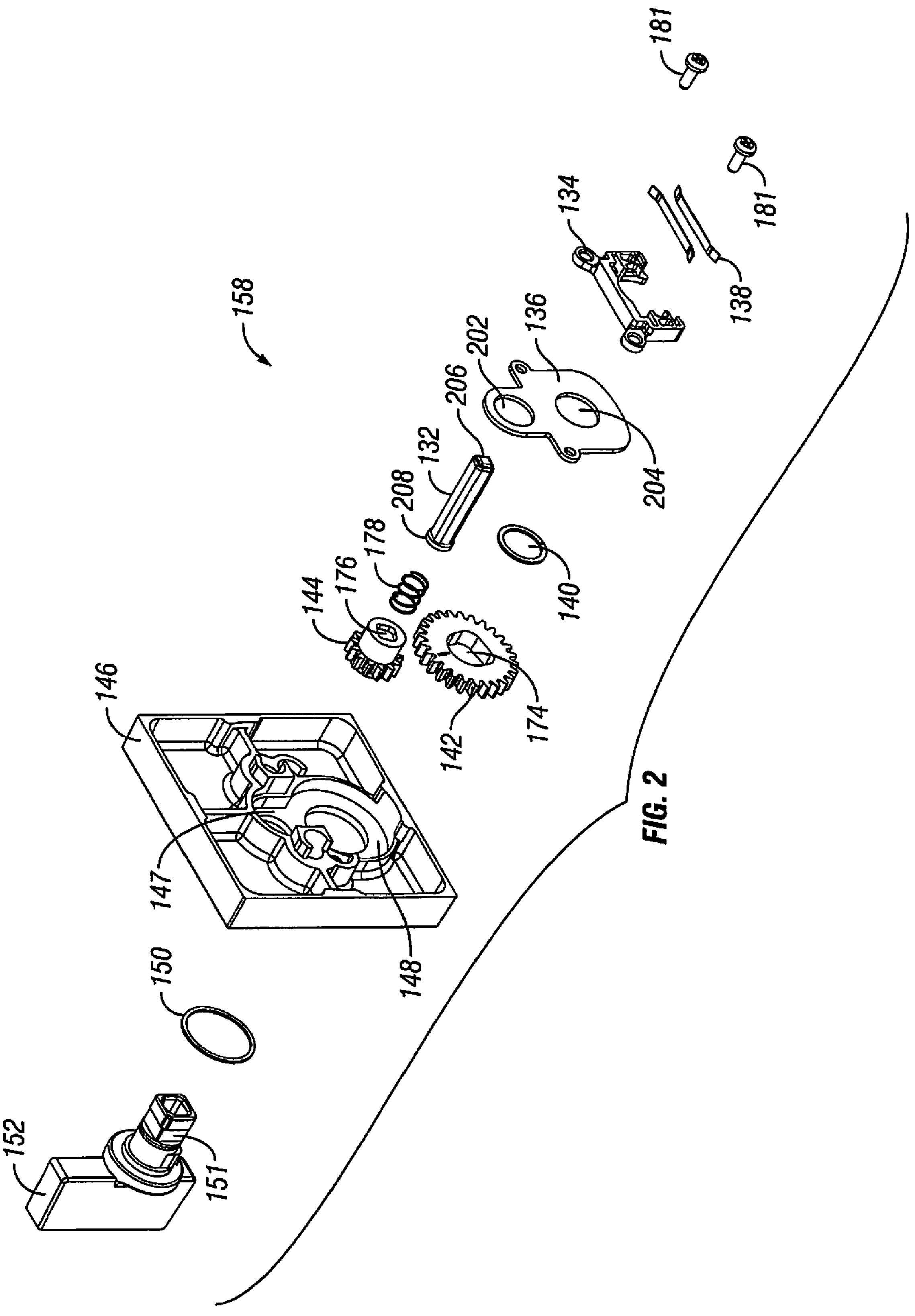
FIG. 2 is a partial exploded view of an interior assembly of the example deadbolt assembly shown in FIG. 1.

Referring now to FIG. 2, the teeth of first gear 142 may be mated with teeth of second gear 144 such that rotation of the first gear 142 results in corresponding rotation of the second gear 144. The second gear 144 is connected with the second torque blade 132. In the embodiment shown, the second torque blade 132 is spring-loaded with a spring 178 to extend through a second gear opening 176. The second gear opening 176 may be keyed to the second torque blade 132, such as with a non-circular shape. The spacer ring 140 and a securing plate 136 cover the interior recesses 147, 148 of the interior escutcheon 146 where the gears 142, 144 are housed. The securing plate 136 includes holes 202, 204 dimensioned to receive the second torque blade 132 and the drive portion 151 of the turn-piece 152, respectively. However, openings 202, 204 arc dimensioned such that the gears 142, 144 are secured in interior recesses 147, 148. A spring retainer 134 and springs 178 mounted in the spring retainer 134 prevent overturning of the turn-piece 152 and are held to the securing plate 136 on a side of the plate opposite the gears 142, 144. Screws 181 pass through holes in the spring retainer 134 and securing plate 136 and mate with the interior of the interior escutcheon 146.

Figure 3:
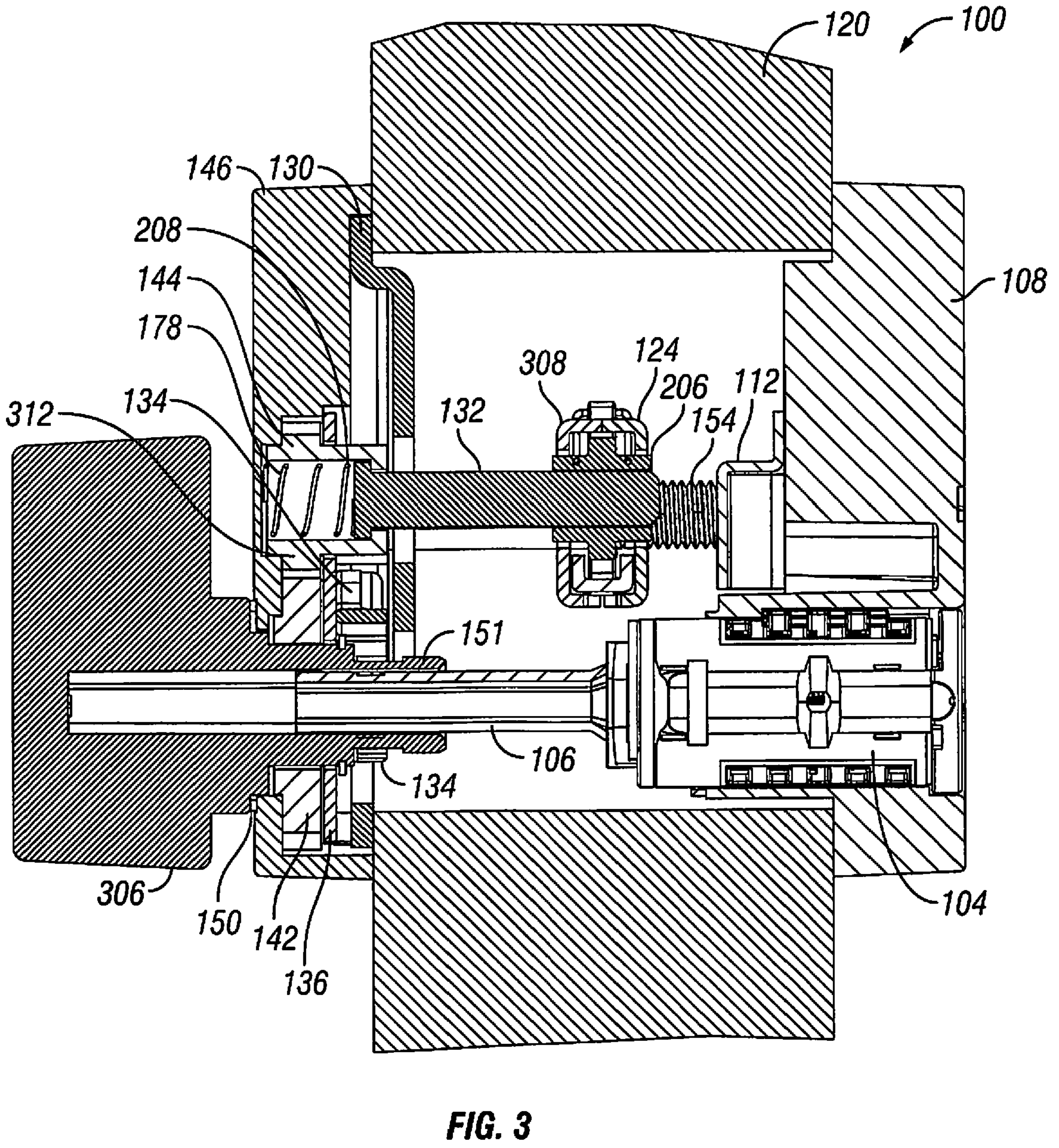
FIG. 3 is a cross-sectional view of the deadbolt assembly mounted in the door bore of FIG. 1.

As seen in FIG. 3, the spatial relationship between the latch assembly 122 and the lock cylinder 104 within the bore 116 can be seen. With the example latch assembly 122 shown in this embodiment, there is space within the bore 116 to accommodate the lock cylinder 104. As discussed above, this type of compact latch assembly is described in U.S. Publication No. 2014/0265357, filed Mar. 6, 2014, for a Deadbolt Latch Assembly, which is hereby incorporated by reference in its entirety. In the embodiment shown, the first torque blade 106 is shaped to pass through first gear opening 174 inside the drive portion 151 of turn-piece 152. The turn-piece 152 is disposed in mounting plate 130 with spacer ring 150 and is shaped to extend through the first gear opening 174 to allow rotation. Turn-piece 152 has a keyed surface 306 that mates with opening 174 of first gear 142. For example. surface 306 may be non-circular in cross-sectional shape. The first gear 142 and turn-piece 152 are coupled together so that turning the turn-piece 152 results in a corresponding turn of the first gear 142. Gear teeth of the first gear 142 and the second gear 144 mate at point 312 such that rotation of one gear causes a corresponding rotation of the other gear.

First torque blade 106 lies in a plane that is parallel to the second torque blade 132. Lock cylinder 104 extends beneath latch assembly 122 allowing for a lower profile at the exterior. Second torque blade 132 includes a proximal radially extending head 208 and a distal end 206 shaped to extend through a hole 308 in the cam 124. Second torque blade 132 is biased via spring 178 in the second gear 144 towards the bolt housing 124.

In operation of the illustrative embodiment, the cam 124 is drivable in a first direction to extend the bolt 172 and a second direction to retract the bolt 172. The cam 124 is configured to receive the distal end of the second torque blade 132 such that rotation of the second torque blade 132 in a first direction retracts the bolt 172; whereas, rotation of the second torque blade 132 in the opposite direction causes the cam 124 to extend the bolt 172. Similar to the first gear 142, the second gear 144, and cam 124 may have openings of a particular shape that are keyed to the shape of the second torque blade 132 so that the second torque blade 132 is able to engage and rotate and translate the rotation between the second gear 144 and the cam 124.

In operation of the disclosed embodiment from the interior, rotation of the turn-piece 152 in a first direction causes a corresponding rotation of first gear 142. The first gear 142 is in contact with the second gear 144 to cause corresponding rotation of the second gear 144 in a first direction which rotates the second torque blade 132. The second torque blade 132, in turn, causes corresponding rotation in the cam 124 and extends deadbolt 172 out of door 120 to a locked position.

Rotation of the turn-piece 152 in a second direction, opposite the first direction, will result in rotation of the gears 142, 144, torque blades 106, 132, and cam 124 in the opposite direction. The opposite rotation of cam 124 will retract the bolt 172 so that the bolt 172 is flush with the plate 170 and the door 120 is unlocked. Since the lock cylinder 104 and the turn-piece 152 are both connected by the first torque blade 106, the lock assembly 100 and gears 142, 144 will function in the same manner when a key is inserted and the cylinder 104 is rotated from the exterior of the door 120.

Examples

Illustrative examples of the low profile deadbolt disclosed herein are provided below. An embodiment of the low profile deadbolt may include any one or more, and any combination of, the examples described below.

Example 1 is a deadbolt assembly with a latch assembly and a lock cylinder. The latch assembly includes a bolt movable between a retracted position and an extended position. The lock cylinder is movable between a locked position and an unlocked position. The deadbolt assembly includes a first torque blade longitudinally extending along a first axis and a second torque blade longitudinally extending along a second axis. The lock cylinder is operatively coupled with at least one of the first torque blade and the second torque blade to impart rotational movement on the other of the first torque blade and second torque blade when moving between the locked position and the unlocked position. The second torque blade is operatively coupled with the latch assembly to actuate the bolt between the retracted position and the extended position. The deadbolt assembly includes a geared arrangement operatively coupling the first torque blade and the second torque blade. The gear arrangement is configured to apply rotational movement of the first torque blade to the second torque blade.

In Example 2, the subject matter of Example 1 is further configured such that the geared arrangement includes a first gear and a second gear.

In Example 3, the subject matter of Example 2 is further configured such that the first torque blade is coupled with the first gear and the second torque blade is coupled with the second gear.

In Example 4, the subject matter of Example 3 is further configured such that the first gear includes teeth meshed with teeth of the second gear.

In Example 5, the subject matter of Example 4 is further configured such that the first axis is substantially coaxial with a longitudinal axis of the lock cylinder.

In Example 6, the subject matter of Example 5 is further configured such that the second axis extends approximately coaxial with at least a portion of the latch assembly.

In Example 7, the subject matter of Example 6 is further configured such that the first axis and second axis lie in planes parallel to each other.

In Example 8, the subject matter of Example 7 is further configured such that the first axis is laterally offset from the second axis.

Example 9 is a deadbolt assembly with a latch assembly, an exterior assembly, and interior assembly. The latch assembly includes a bolt movable between a retracted position and an extended position. The exterior assembly includes a lock cylinder movable between a locked position and an unlocked position. The interior assembly includes a turn-piece movable between a locked position and an unlocked position. A first torque blade is provided that extends longitudinally between the lock cylinder and the turn-piece along a first axis. The lock cylinder is operatively coupled with the first torque blade to impart rotational movement on the first torque blade when moving between their locked and unlocked positions. A second torque blade is provided that extends longitudinally along a second axis. The second torque blade is operatively coupled with the latch assembly to actuate the bolt between the retracted position and the extended position. The deadbolt assembly includes a geared arrangement operatively coupling the first torque blade and the second torque blade. The geared arrangement is configured to apply rotational movement of the first torque blade to the second torque blade. The movement of the lock cylinder between the locked and unlocked positions imparts rotational movement on the second torque blade via the geared arrangement with the first torque blade to actuate the bolt between the retracted position and the extended position.

In Example 10, the subject matter of Example 9 is further configured such that the geared arrangement is configured so that rotation of the first torque blade results in corresponding rotation of the second torque blade.

In Example 11, the subject matter of Example 10 is further configured such that the geared arrangement includes a first gear and a second gear.

In Example 12, the subject matter of Example 11 is further configured such that the first torque blade is coupled with the first gear and the second torque blade is coupled with the second gear.

In Example 13, the subject matter of Example 12 is further configured such that the first gear includes teeth meshed with teeth of the second gear.

In Example 14, the subject matter of Example 13 is further configured such that the first axis is substantially coaxial with a longitudinal axis of the lock cylinder.

In Example 15, the subject matter of Example 14 is further configured such that the second axis extends approximately coaxial with at least a portion of the latch assembly.

In Example 16, the subject matter of Example 15 is further configured such that first axis and second axis lie in planes parallel to each other.

In Example 17, the subject matter of Example 16 is further configured such that the first axis is laterally offset from the second axis.

In Example 18, the subject matter of Example 17 is further configured such that an escutcheon extends from the turn-piece.

In Example 19, the subject matter of Example 18 is further configured such that the escutcheon defines an interior compartment with a first recessed area dimensioned to receive the first gear and a second recessed area dimensioned to receive the second gear.

In Example 20, the subject matter of Example 9 is further configured such that the first torque blade extends along a longitudinal axis laterally offset from a longitudinal axis of the latch assembly.

In Example 21, the subject matter of Example 20 is further configured such that the second torque blade extends through at least a portion of the latch assembly.

In Example 22, the subject matter of Example 9 is further configured such that a biasing member urges the second torque blade towards the latch assembly.

In Example 23, the subject matter of Example 9 is further configured such that the turn-piece is operatively coupled with at least one of the first torque blade and the second torque blade.

In Example 24, the subject matter of Example 23 is further configured such that the movement of the turn-piece between the locked and unlocked positions imparts rotational movement on the second torque blade to actuate the bolt between the retracted position and the extended position.

Example 25 is a method of operating a lock. The method includes the step of providing a deadbolt with a bolt movable between an extended position and a retracted position, the deadbolt including a first torque blade and a second torque blade coupled together in geared relation such that rotation of the first torque blade results in corresponding rotation of the second torque blade, wherein rotation of the second torque blade in a first direction moves the bolt to the extended position and rotation of the second torque blade in a second direction moves the bolt to the retracted position. The second torque blade is rotated in the first direction to move the bolt to the extended position by rotating the first torque blade to a locked position. The second torque blade is rotated in the second direction to move the bolt to the retracted position by rotating the first torque blade to an unlocked position.

In Example 26, the subject matter of Example 25 is further configured such that rotating the first torque blade to the locked position is performed by at least one of: (1) inserting a key into a lock cylinder of the deadbolt and rotating the key; and (2) rotating a turn-piece of the deadbolt.

In Example 27, the subject matter of Example 25 is further configured such that the second torque blade is coupled with the turn-piece of the deadbolt.

Although the present disclosure has been described with reference to particular means, materials, and embodiments, from the foregoing description, one skilled in the art can easily ascertain the essential characteristics of the invention and various changes and modifications may be made to adapt the various uses and characteristics without departing from the spirit and scope of the invention.

The invention claimed is:

1. A deadbolt assembly comprising:
- a latch assembly configured to be mounted at least partially within a bore of a door, the latch assembly including a cam and a bolt, the cam configured to move the bolt between at least an extended position and a retracted position;
- a first assembly having a first escutcheon configured to be mounted at the bore of the door;
- a second assembly having a second escutcheon configured to be mounted at the bore of the door;
- a first torque blade extending between the first escutcheon and the second escutcheon within the bore of the door and rotatable around a first axis via at least one of a lock actuator and a turn-piece, the first axis coaxial with the at least one of the lock actuator and the turn-piece, wherein the first torque blade is disposed beneath the latch assembly in the bore of the door;
- a second torque blade extending from the second escutcheon, the second torque blade rotatable around a second axis offset from the first axis and passing through the cam of the latch assembly; and
- a geared arrangement supported on the second escutcheon and coupling rotational movement of the first torque blade to rotational movement of the second torque blade such that rotation of the first torque blade drives movement of the bolt between the extended position and the retracted position.

2. The deadbolt assembly of claim 1, wherein the geared arrangement includes a first gear coupled to the first torque blade and a second gear coupled to the second torque blade.

3. The deadbolt assembly of claim 2, wherein the first gear is keyed to the turn-piece and the turn-piece receives the first torque blade.

4. The deadbolt assembly of claim 1, wherein the second assembly includes a mounting plate covering at least a portion of the geared arrangement.

5. The deadbolt assembly of claim 1, wherein the second assembly further includes a spring retainer and springs configured to reduce overturning of the turn-piece.

6. The deadbolt assembly of claim 1, wherein the first assembly is an exterior assembly having the lock actuator and the second assembly is an interior assembly having the turn-piece.

7. The deadbolt assembly of claim 6, wherein the turn-piece and the lock actuator are rotationally connected.

8. The deadbolt assembly of claim 6, wherein the exterior assembly includes an anti-drill shield.

9. The deadbolt assembly of claim 6, further including one or more fasteners extending through the second escutcheon and fastened into the first escutcheon.

10. The deadbolt assembly of claim 1, wherein the lock actuator includes a lock cylinder or an electronic lock.

11. A method of installing a deadbolt assembly at a bore of a door, the method comprising:
- mounting a latch assembly within the bore or of the door, the latch assembly including a cam and a bolt, the cam configured to move the bolt between at least an extended position and a retracted position;
- mounting a first assembly having a first escutcheon to the bore of the door at a first side, wherein a first torque blade rotatable around a first axis is disposed within the bore of the door and extends from the first escutcheon, wherein the first torque blade is disposed beneath the latch assembly within the bore of the door; and
- mounting a second assembly having a second escutcheon to the bore of the door at an opposite second side, wherein the first torque blade extends between the first escutcheon and the second escutcheon and is rotatable via at least one of a lock actuator and a turn-piece, the first axis coaxial with the at least one of the lock actuator and the turn-piece, wherein a second torque blade extends from the second escutcheon and passes through the latch assembly, the second torque blade rotatable around a second axis offset from the first axis and coupled to the latch assembly, and wherein a geared arrangement is supported on the second escutcheon and couples rotational movement of the first torque blade to rotational movement of the second torque blade such that rotation of the first torque blade drives movement of the bolt between the extended position and the retracted position.

12. The method of claim 11, wherein the geared arrangement includes a first gear and a second gear coupled to the second torque blade, and wherein mounting the second assembly includes coupling the first gear to the first torque blade.

13. The method of claim 12, wherein coupling the first gear to the first torque blade includes receiving the first torque blade in the turn-piece, the turn-piece keyed with the first gear.

14. The method of claim 11, wherein mounting the second assembly includes positioning a mounting plate at least partially within the bore of the door.

15. The method of claim 11, wherein the first side of the door is an exterior side and the second side of the door is an interior side.

16. The method of claim 11, wherein the first assembly is an exterior assembly having the lock actuator and the second assembly is an interior assembly having the turn-piece.

17. The method of claim 16, wherein mounting the second assembly includes rotationally connecting the turn-piece and the lock actuator.

18. The method of claim 16, further comprising securing the second escutcheon to the first escutcheon with one or more fasteners extending through the second escutcheon and fastened into the first escutcheon.

19. A deadbolt assembly comprising:
- a latch assembly configured to be mounted at least partially within a bore of a door, the latch assembly including a cam and a bolt, the cam configured to move the bolt between at least an extended position and a retracted position;
- a first assembly having a first escutcheon configured to be mounted at the bore of the door;
- a second assembly having a second escutcheon configured to be mounted at the bore of the door;

a first torque blade extending between the first escutcheon and the second escutcheon within the bore of the door and rotatable around a first axis via at least one of a lock actuator and a turn-piece, the first axis coaxial with the at least one of the lock actuator and the turn-piece;

a second torque blade extending from the second escutcheon, the second torque blade rotatable around a second axis offset from the first axis and passing through the cam of the latch assembly; and a geared arrangement supported on the second escutcheon and coupling rotational movement of the first torque blade to rotational movement of the second torque blade such that rotation of the first torque blade drives movement of the bolt between the extended position and the retracted position, wherein the first assembly is an exterior assembly having the lock actuator and the second assembly is an interior assembly having the turn-piece, and wherein the turn-piece and the lock actuator are rotationally connected.

* * * * *